United States Patent
Vernon

(10) Patent No.: US 12,291,635 B2
(45) Date of Patent: May 6, 2025

(54) COMPOSITION FOR PROTECTING LIGHT SENSITIVE MATERIALS

(71) Applicant: Avient Corporation, Avon Lake, OH (US)

(72) Inventor: Gary Vernon, Sugar Hill, GA (US)

(73) Assignee: Avient Corporation, Avon Lake, OH (US)

( * ) Notice: Subject to any disclaimer, the term of this patent is extended or adjusted under 35 U.S.C. 154(b) by 908 days.

(21) Appl. No.: 17/299,701

(22) PCT Filed: Dec. 5, 2019

(86) PCT No.: PCT/US2019/064688
§ 371 (c)(1),
(2) Date: Jun. 3, 2021

(87) PCT Pub. No.: WO2020/118059
PCT Pub. Date: Jun. 11, 2020

(65) Prior Publication Data
US 2022/0098403 A1     Mar. 31, 2022

Related U.S. Application Data

(60) Provisional application No. 62/775,529, filed on Dec. 5, 2018.

(51) Int. Cl.
| | |
|---|---|
| *C08L 67/02* | (2006.01) |
| *B65D 81/30* | (2006.01) |
| *C08J 3/22* | (2006.01) |

(52) U.S. Cl.
CPC .............. *C08L 67/02* (2013.01); *B65D 81/30* (2013.01); *C08J 3/22* (2013.01); *C08J 2367/02* (2013.01); *C08L 2201/08* (2013.01); *C08L 2205/025* (2013.01); *C08L 2205/03* (2013.01); *C08L 2205/06* (2013.01); *C08L 2310/00* (2013.01)

(58) Field of Classification Search
CPC ................ C08L 67/02; C08L 2201/08; C08L 2205/025; C08L 2205/03; C08L 2205/06; C08L 2310/00; C08J 3/22; C08J 2367/02; B65D 81/30
See application file for complete search history.

(56) References Cited

U.S. PATENT DOCUMENTS

| | | |
|---|---|---|
| 6,197,851 B1 | 3/2001 | Maxwell et al. |
| 6,355,723 B1 | 3/2002 | van Baal et al. |
| 6,375,864 B1 | 4/2002 | Phillips et al. |
| 9,314,489 B2 | 4/2016 | Kelly et al. |
| 9,486,487 B2 | 11/2016 | Cutcliffe et al. |
| 10,087,304 B2 | 10/2018 | Zhu et al. |
| 2005/0228085 A1 | 10/2005 | Koshida et al. |
| 2006/0035924 A1 | 2/2006 | Schmid |
| 2007/0029912 A1 | 2/2007 | Park et al. |
| 2007/0129470 A1 | 6/2007 | Kuvshinnikova et al. |
| 2007/0129482 A1* | 6/2007 | Kuvshinnikova ....... C08L 51/04 524/500 |
| 2007/0190139 A1 | 8/2007 | Zerbe et al. |
| 2011/0124837 A1 | 5/2011 | Hong et al. |
| 2011/0168596 A1 | 7/2011 | Fujita |
| 2012/0165422 A1* | 6/2012 | Vernon .................... C08J 3/20 524/502 |
| 2018/0140648 A1 | 5/2018 | Segal et al. |

FOREIGN PATENT DOCUMENTS

| | | |
|---|---|---|
| CN | 1505669 A | 6/2004 |
| CN | 1650195 A | 8/2005 |
| CN | 103443182 A | 12/2013 |
| CN | 108503740 A | 9/2018 |
| ES | 2353865 T3 | 3/2011 |
| JP | 2002068202 A | 3/2002 |
| JP | 2003341748 A | 12/2003 |
| WO | 2007129893 A1 | 11/2007 |
| WO | 2011040905 A1 | 4/2011 |
| WO | 2016058985 A1 | 4/2016 |
| WO | 2016070151 A1 | 5/2016 |
| WO | 2018038954 A1 | 3/2018 |

OTHER PUBLICATIONS

15426M PCT Search Report and Written Opinion for PCT/US2019/064570 dated Mar. 10, 2020.
Heredia-Guerrero et al. Cutin from agro-waste as a raw material for the production of bioplastics. Journal of Experimental Botany, vol. 68, No. 19 pp. 5401-5410, 2017. (Year: 2017).
PCT Search Report and Written Opinion for PCT/US2019/064570.

* cited by examiner

Primary Examiner — Bijan Ahvazi
(74) Attorney, Agent, or Firm — Michael J. Sambrook; John H. Hornickel

(57) ABSTRACT

A composition to protect light-sensitive therapeutics includes a combination of two different anthraquinone dyes and titanium dioxide to protect the light-sensitive therapeutics from UV-Vis light in the range of 190 to 750 mm.

7 Claims, No Drawings

COMPOSITION FOR PROTECTING LIGHT SENSITIVE MATERIALS

CLAIM OF PRIORITY

This application claims the benefit of U.S. Provisional Patent Application Ser. No. 62/775,529 filed on Dec. 5, 2018, which is hereby incorporated by reference in its entirety.

JOINT RESEARCH AGREEMENT UNDER 35 USC § 102(c)

The subject matter disclosed in this application was developed and the claimed invention was made by, or on behalf of, one or more parties to a joint research agreement that was in effect on or before the effective filing date of the claimed invention. The claimed invention was made as a result of activities undertaken within the scope of the joint research agreement. The parties to that joint research agreement are The Procter & Gamble Company and PolyOne Corporation. Therefore, subject matter disclosed herein and the claimed invention herein shall be deemed to have been owned by the same person or subject to an obligation of assignment to the same person in applying the provisions of subsection 35 USC § 102 (b)(2)(C).

FIELD OF THE INVENTION

This invention concerns a thermoplastic composition of polyester and a specific combination of colorants which absorb, reflect, and block visible light in the same wavelengths as light sensitive materials absorb.

BACKGROUND OF THE INVENTION

Spoilage of food has been a problem for centuries. While the sun is the ultimate source of natural energy, whether currently radiant or previously stored, the wavelengths of sunlight in the electromagnetic spectrum cause photo-oxidation of photo-sensitive molecules in food or other ingestible chemicals such as vitamins, pharmaceuticals, dietary supplements, hormones, etc.

Degradation via photo-oxidation can cause loss of therapeutic or caloric effectiveness, change of color, or change of taste. Use of colorants such green or brown colorants in glass is known as a means to reduce or diminish the effects of photo-oxidation for foods such as beer and fruit juices. The colorants are chosen to absorb visible light in the wall of the glass container in the same wavelength ranges as are absorbed by the photo-sensitive food ingredient(s).

Certain colorants such as titanium dioxide pigment reflect visible light from the wall of the container in the same wavelength ranges as are absorbed by those same photosensitive ingredients. Moreover, the particles of titanium dioxide present in a sufficient amount also contribute opacity to the wall of the container.

Increasingly, vitamins, pharmaceuticals, dietary supplements, hormones, and other complex human medicaments and supplements (collectively "light-sensitive therapeutics") are desired for oral administration from storage in quantities suitable for individual usage. Both prescription and over-the-counter ("OTC") light-sensitive therapeutics utilize small plastic vessels containing about sixty (60) milliliters (two (2) ounces) of liquid or about ninety (90) pills or capsules. Contents in such vessels need protection from ultra-violet (UV) light and visible (Vis) light (collectively "UV-Vis" light).

Placing light-sensitive therapeutics into plastic vessels of any type (bottles, containers, pouches, etc.) is a common way of transport and storage until use. To the extent that the vessel is transparent, a preference currently in the display of the contents in the vessel and during subsequent storage, the transmission of UV-Vis light through a transparent plastic vessel can be quite detrimental to the therapeutic value, coloration, and taste of light-sensitive therapeutics in the plastic vessel. This is true whether the light source is natural from sunlight or artificial via incandescent or fluorescent lighting, although the intensity of natural sunlight is more harmful to photo-sensitive chemicals.

It is known that one or more light-sensitive therapeutics need protection in the UV-Vis wavelength range of 190 nm-750 nm. The protection in the visible wavelength range of 600 nm-750 nm is quite difficult to achieve.

SUMMARY OF THE INVENTION

What the art needs is a combination of colorants which can collectively absorb, reflect, and render opaque plastic used in a vessel in the broad range of 190 nm-750 nm to protect light-sensitive therapeutics from photo-oxidation.

Protection is deemed achieved when there is 1 percent or less transmission through a plastic plaque of 0.5 mm thickness.

According to the present invention, a particular combination of colorants (two dyes and one pigment) can provide such protection from photo-oxidation of light-sensitive therapeutics in transparent plastic vessels containing food or other items including light-sensitive therapeutics. The two dyes absorb visible light to minimize transmission to reach the light-sensitive therapeutics. The pigment both reflects visible light chemically and blocks UV-Vis light physically to minimize its transmission to reach the light-sensitive therapeutics.

One aspect of the present invention is a composition for protection of light-sensitive therapeutics within a plastic vessel, comprising: (a) polyester; (b) a first anthraquinone dye; (c) a second anthraquinone dye absorbing visible light above 650 nm in an amount of at least 0.04 weight percent of the composition; and (d) titanium dioxide; wherein light-sensitive therapeutics absorb UV-Vis light in the range of 190 nm-750 nm and wherein the combination of the first anthraquinone dye, the second anthraquinone dye, and the titanium dioxide absorbs, reflects, and blocks UV-Vis light in the range of 190 nm-750 nm at 1% or less UV-Vis light transmission at a composition thickness of 0.5 mm.

Another aspect of the present invention is a plastic vessel made from the composition as disclosed herein.

A further aspect of the present invention is a method of using colorants to protect light-sensitive therapeutics within a plastic vessel, comprising the steps of: (a) mixing to form a composition, a polyester, a first anthraquinone dye, a second anthraquinone dye absorbing visible light above 650 nm in an amount of at least 0.04 weight percent of the composition, and titanium dioxide; (b) shaping the composition into the plastic vessel; (c) placing a liquid containing light-sensitive therapeutics into the plastic vessel; wherein light-sensitive therapeutics absorb UV-Vis light in the range of 190 nm-750 nm and wherein the combination of the first anthraquinone dye, the second anthraquinone dye, and the titanium dioxide absorbs, reflects, and blocks UV-Vis light in the range of 190 nm-750 nm at 1% or less UV-Vis light transmission at a vessel thickness of 0.5 mm.

Embodiments of the invention are identified below.

EMBODIMENTS OF THE INVENTION

Polyester Resin

Flexible and rigid packaging, bottles, containers, pill boxes, and other vessels for transport and storage of light-sensitive therapeutics often are made from polyester. Any polyester is a candidate for use in this invention.

For the transport and storage of light-sensitive therapeutics, those polyester resins which have been approved for light-sensitive therapeutics packaging by national or regional governments are particularly preferred.

Any polyester is a candidate for use in the present invention. The formation of a polyester from a monool or a polyol and an acid or its ester encompasses many different suitable types of polyesters for use in this invention. The monomeric units can be formed reactions of either aliphatic moieties, aromatic moieties, or both. Desirably, the polyester is transparent or semi-transparent in order to accentuate the effect of the stress forming event.

Non-limiting examples of polyesters include terephthalates, terephthalate glycols, lactides, (hydroxy)alkanoates, copolyesters of terephthalic acid residues, 2,2,4,4-tetramethyl-1,3-cyclobutanediol, and 1,4-cyclohexanedimethanol, etc., or combinations thereof.

Additionally, one can use homopolyesters or copolyesters, such as homopolymers and copolymers of terephthalic acid and isophthalic acid. The linear polyesters may be produced by condensing one or more dicarboxylic acids or a lower alkyl diester thereof, e.g., dimethylterephthalate, terephthalic acid, isophthalic acid, phthalic acid, 2,5-, 2,6-, or 2,7-naphthalene dicarboxylic acid, succinic acid, sebacic acid, adipic acid, azelaic acid, bibenzoic acid and hexahydroterephthalic acid, or bis-p-carboxyphenoxyethane, with one or more glycols, e.g., ethylene glycol, pentyl glycol, and 1,4-cyclohexanedimethanol.

Of these various polyester candidates, because of commercial availability, the terephthalates, such as polyethylene terephthalate (PET) or polybutylene terephthalate (PBT), the lactides, such as polylactic acid (PLA), and the hydroxyalkanoates, such as polyhydroxybutyrate (PHB) or polyhydroxybutyrate-co-valerate (PHBV), are desirable for use. PET is currently preferred because of its ubiquity and cost, although PLA and PHBV are emerging as bio-derived thermoplastic polyesters which can supplant PET in whole or in part in certain markets.

Protective Colorants

Because light-sensitive therapeutics can absorb UV-Vis light in wavelengths in the broad range of 190 nm-750 nm, the invention requires the combination of particular dyes and pigment which collectively absorb, reflect, and block UV-Vis light in the same or similar wavelength range.

Unexpectedly, it has been found that three specific colorants, two organic dyes of different chemistries and titanium dioxide pigment, provide the range of absorption sufficiently protective of light-sensitive therapeutics, such that their placement into polyester resin results in nearly total absorption of light in the wavelengths from 190 nm to 750 nm. Stated another way, the two organic dyes and titanium dioxide pigment resident in the polyester resin in the plastic vessel minimize the transmission of light in the wavelengths from 190 nm to 750 nm before such UV-Vis light can reach the light-sensitive therapeutics and cause harmful photo-oxidation.

The first organic dye is an anthraquinone dyestuff which absorbs visible light at 430-630 nm. One commercially available dye is Macrolex™ Red Violet R Gran Solvent Soluble dye from Lanxess of Germany. Generically using the Solvent Violet (SV) description, the first anthraquinone dyestuff is a combination of Disperse Violet 31 and Disperse Violet 26.

The second organic dye is also an anthraquinone dyestuff which absorbs visible light at 440-700. One commercially available dye is Macrolex™ Violet B dye, also from Lanxess. Generically using the SV description, the second anthraquinone dye is Solvent Violet 13.

The third protective colorant is titanium dioxide which reflects visible light at 400 nm-1000 nm and in suitable concentrations physically helps render opaque a plastic cross-section. One commercially available titanium dioxide is from Cristal using the Tiona™ brand.

As the examples will demonstrate below, both dyes and titanium dioxide are required to provide chemical and physical minimization of transmission of UV-Vis light of 190-750 at 1% or less transmission in a plastic article with a thickness of 0.5 mm. As the examples will also demonstrate, very small quantities of such dyes and pigment are enough to combine to provide minimize light transmission at such wavelengths.

Optional Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as Plastics Additives Database (2004) Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-oxidants; anti-static agents; bonding, blowing and foaming agents; dispersants; fillers and extenders; fire and flame retardants and smoke suppresants; impact modifiers; initiators; lubricants; micas; additional colorants; plasticizers; processing aids; release agents; silanes, titanates and zirconates; slip and anti-blocking agents; stabilizers; stearates; ultraviolet light absorbers; viscosity regulators; waxes; and combinations of them.

Table 1 shows acceptable, desirable, and preferable ranges of ingredients useful in the present invention, all expressed in weight percent (wt. %) of a masterbatch. The masterbatch can comprise, consist essentially of, or consist of these ingredients. Any number between the ends of the ranges is also contemplated as an end of a range, such that all possible combinations are contemplated within the possibilities of Table 1 as candidate masterbatches for use in this invention.

TABLE 1

| | Masterbatch | | |
|---|---|---|---|
| Ingredient (Wt. Percent) | Acceptable | Desirable | Preferable |
| Polyester Resin | 47-80.5 | 57.4-72.9 | 60.5-67.3 |
| First Anthraquinone Dye | 7-15 | 8-12 | 9.5-10.0 |
| Second Anthraquinone Dye | 2.5-4 | 3.1-3.6 | 3.2-3.5 |
| Titanium Dioxide | 10-24 | 15-20 | 18-20 |
| Optional Additives | 0-10 | 1-7 | 2-6 |

Table 2 shows the final compound ingredients computed at a 2% let down ratio ("LDR") in acceptable, desirable, and preferable ranges of ingredients useful in the present invention, all expressed in weight percent (wt. %) of a compound at the 2% LDR. The compound can comprise, consist essentially of, or consist of these ingredients. Any number between the ends of the ranges is also contemplated as an end of a range, such that all possible combinations are contemplated within the possibilities of Table 2 as candidate compounds, respectively, for use in this invention.

TABLE 2

Compound at Let Down Ratio of 2% (50:1 Ratio)

| Ingredient (Wt. Percent) | Acceptable | Desirable | Preferable |
| --- | --- | --- | --- |
| Polyester Resin | 98.94-99.61 | 99.15-99.46 | 99.21-99.35 |
| First Anthraquinone Dye | 0.14-0.30 | 0.16-0.24 | 0.19-0.20 |
| Second Anthraquinone Dye | 0.05-0.08 | 0.062-0.072 | 0.064-0.070 |
| Titanium Dioxide | 0.20-0.48 | 0.30-0.40 | 0.36-0.40 |
| Optional Additives | 0.00-0.20 | 0.02-0.14 | 0.04-0.12 |

The ratio of letdown determines the amount of polyester resin for the carrier of the concentrate and the amount of polyester resin into which the concentrate is let down. LDR from a masterbatch can range from about 0.5-10% LDR with 2% LDR being preferred. Moreover, a person having ordinary skill in the art without undue experimentation can adjust the LDR to accommodate preferences in the final plastic vessel to protect the light-sensitive therapeutics.

Processing

The preparation of masterbatches and compounds of the present invention is uncomplicated. Either one can be made in batch or continuous operations. Gravimetric blenders or feeders are recommended for better processing than dosing meters.

Mixing in a continuous process typically occurs in an extruder that is elevated to a temperature that is sufficient to melt the polymer matrix with addition either at the head of the extruder or downstream in the extruder of the liquid and solid ingredient additives. Extruder speeds can range from about 50 to about 1000 revolutions per minute (rpm), and preferably from about 300 to about 750 rpm. Typically, the output from the extruder is pelletized for later extrusion or molding into polymeric articles.

Mixing in a batch process typically occurs in a mixer that is also elevated to a temperature that is sufficient to melt the polymer matrix to permit addition of the solid ingredient additives. The mixing speeds range from 60 to 1000 rpm and temperature of mixing can be ambient. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.elsevier.com), one can make articles of any conceivable shape and appearance using compounds of the present invention.

Of the many types of plastic vessels, self-supporting plastic containers, such as plastic bottles of various sizes, is a preferred shape of plastic vessel for the transport and storage of light-sensitive therapeutics. Self-supporting containers are often made via stretch blow molding.

Stretch blow molding is a subset of conventional blow molding, often used in making containers. The final shape is achieved via one stage or two stages.

In a one stage blow molding, a "parison" is formed having some final dimensions (the "finish" such as the screw cap portion of the ultimate container) and nearly immediately then subjected to blow molding with a deliberate stretch of the non-final dimensions expanded to their intended shape. Depending on the design, the stretching occurs both in the axial direction of the parison and in the hoop or radial direction also.

In a two stage blow molding, a "preform" is formed via conventional injection molding and having some final dimensions (the "finish" such as the screw cap portion of the ultimate container) and the remainder having shrunken dimensions for convenience of transport and storage until final stress formation.

In the second stage, the preform is heated to an appropriate softening temperature and gas is used to deliberately stretch to its final intended shape. Depending on the design, the stretching occurs both in the axial direction of the preform and in the hoop or radial direction also.

The amount of deliberate stretching force applied, measured by the reduction in thickness in the preform to the final part can be described as the stretch ratio: wall thickness of preform divided by wall thickness of part.

The composition for protection of light-sensitive therapeutics can be molded into a final container while undergoing expansion at stretch ratios ranging from about 1.5:1 to about 200:1, and preferably from about 3:1 to about 50:1.

Also, the length of the preform usually expands during blow molding to a final part length about 1:1 to about 200:1. For the examples, which follow, that longitudinal or axial expansion ratio is about 2:1.

Heated air is usually used in the stretch blow molding process, although other gases can be used.

It is known that polyester can be strengthened by stretch blow molding because the resulting strain is hardened into the plastic article after cooling. This strengthening in a container can assist in the storage of fluids having a high vapor pressure, such as carbonated soft drinks and the like.

USEFULNESS OF THE INVENTION

Any plastic vessel containing any light-sensitive therapeutic can benefit from the present invention using the unique combination of two organic dyes of two different chemistries and titanium dioxide.

The minimization of transmission of UV-Vis light in the wavelengths of 190 nm-750 nm protects the expensive light-sensitive therapeutics from photo-oxidation and spoilage.

The Examples further explain this invention.

EXAMPLES

Comparative Example A and Comparative Example B are the formulations of the masterbatch and compound (2% LDR), respectively, which were found to be inadequate to protect a light-sensitive therapeutic, namely: melatonin hormone, from 1% or less transmission from 190 nm up to 750 nm wavelength.

Example 1 and Example 2 are the formulations of the masterbatch and compound (2% LDR), respectively, which were found to protect the same light-sensitive therapeutic from 1% or less transmission up to 750 nm wavelength using a plaque of 0.5 mm thickness.

Table 3 shows the formulations of Comparative Examples A-B and Examples 1-2. Each of them was mixed in a high speed mixer at ambient temperature until all ingredients were well dispersed. Then the mixtures of each were melted and cast into a 0.5 mm thick plaque for testing of UV-Vis light transmission using a Perkin-Elmer UV-Visible spectrometer, following the instructions identified in the "Technical Note: Validating UV/Visible Spectrophotometers" published by Perkin-Elmer in 2012.

Table 4 shows the percentage light transmission values at various wavelengths for Comparative Example B and Example 2.

TABLE 3

Formulations

| Ingredient (Wt. %) | Comp. A | Example 1 | Comp. B | Example 2 |
|---|---|---|---|---|
| Laser+ C (E60A) (Pulverized) polyethylene terephthalate copolymer resin (IV = 0.81) (DAK Americas) | 64.17 | 60.44 | 1.2834 | 1.209 |
| Laser+ C (E60A) (Pellet) polyethylene terephthalate copolymer resin (IV = 0.81) (DAK Americas) | 16.04 | 3.18 | 0.3208 | 0.0636 |
| Laser+ C (E60A) (Pellet) polyethylene terephthalate copolymer resin (IV = 0.81) (DAK Americas) | 0.0 | 0.0 | 98.0 | 98.0 |
| Macrolex Red Violet R Gran. Anthraquinone dye (Lanxess, Germany) -- Absorbs at 430-630 nm | 4.9 | 9.8 | 0.098 | 0.196 |
| Macrolex Violet B Anthraquinone dye (Lanxess, Germany) -- Absorbs at 440-700 nm. | 1.68 | 3.37 | 0.0338 | 0.0674 |
| Tiona 188 blue tone chloride-process rutile titanium dioxide pigment (Cristal) - Reflects at 400 nm-1000 nm | 9.0 | 18.0 | 0.18 | 0.36 |
| Irganox 1010 Pentaerythritol tetrakis(3-(3,5-DI-tert-butyl-4-hydroxyphenyl)propionate) phenolic antioxidant (BASF) | 0.2 | 0.2 | 0.004 | 0.004 |
| Epoxidized Soybean Oil plasticizer (Chemtura) | 1.0 | 0.0 | 0.02 | 0 |
| Maxsperse W-3000 alkoxylated alcohol dispersant (PCC Chemax) | 3.0 | 5.0 | 0.06 | 0.1 |

TABLE 4

Light Transmission (%)

| Wavelength (nm) | Comp. B | Example 2 |
|---|---|---|
| 190-625 | ~0 | ~0 |
| 650 | 0.1 | ~0 |
| 700 | 2.5 | 0.2 |
| 750 | 7.0 | 1.0 |
| 800 | 12.0 | 1.5 |
| 850 | 20.0 | 2.5 |

Table 4 shows the results of the UV-visible light transmission test of Comparative Example B and Example 2. While Comparative Example B provides nearly zero UV-Vis light transmissions from 190 nm to about 650 nm, the formulation failed to provide 1% or less light transmission starting between 650 nm and 700 nm and continuing up to 750 nm, the requirement for success. By contrast, Example 2 demonstrated 1% or less light transmission across the complete range of 190 nm-750 nm, satisfying requirements of UV-Vis protection for light-sensitive therapeutics.

Each of the amounts of the two dyes and the titanium dioxide pigment were doubled between Comparative Example B and Example 2 in order to achieve success. Opacity (physical light blockage) was contributed mostly by the titanium dioxide pigment which also contributed reflectance. Absorption was contributed mostly by the two dyes, at partially overlapping wavelengths.

It is unpredictable that the doubling of amount of the two anthraquinone dyes and titanium dioxide would turn failure into success, especially at 750 nm, where Example 2 outperforms Comparative Example B by a factor of seven times for the 0.5 mm thick samples. Indeed, Example 2 provides up to only 2.5% visible light transmission up to 850 nm.

It is also unpredictable and quite surprising that such a small increase of the amount of the two dyes and the one pigment (0.312 weight percent) in the compound of Example 2 vs. the compound of Comparative Example B would result in seven times less visible light transmission at 750 nm for the 0.5 mm thick samples.

Without undue experimentation, those having ordinary skill in the art can utilize the written description, including the Examples, to make and use aspects of the disclosed invention.

All documents cited in the Embodiments of the Invention are incorporated herein by reference in their entirety unless otherwise specified. The citation of any document is not to be construed as an admission that it is prior art with respect to the disclosed invention.

While particular embodiments of the disclosed invention have been illustrated and described, it would be obvious to those skilled in the art that various other changes and modifications can be made without departing from the spirit and scope of the invention. The appended claims are intended to cover all such changes and modifications within the scope of the disclosed invention.

What is claimed is:

1. A thermoplastic composition consisting of:
   (a) about 98.94% to about 99.61%, by weight of the thermoplastic composition, of a polyester,
   (b) about 0.14% to about 0.30%, by weight of the thermoplastic composition, of a first anthraquinone dye comprising a combination of Disperse Violet 31 and Disperse Violet 26,
   (c) about 0.05% to about 0.08%, by weight of the thermoplastic composition, of a second anthraquinone dye comprising Solvent Violet 13,
   (d) about 0.20% to about 0.48%, by weight of the thermoplastic composition, of titanium dioxide, and
   (e) 0 to about 0.20%, by weight of the thermoplastic composition, of at least one additive selected from antioxidant, plasticizer, and dispersant, wherein the antioxidant is selected from phenolic antioxidant.

2. The thermoplastic composition of claim 1, wherein a plaque molded from the thermoplastic composition blocks UV-Vis light in the range of 190 nm to 750 nm with 1% or less UV-Vis light transmission at a plaque thickness of 0.5 mm.

3. The thermoplastic composition of claim 1, wherein the polyester is selected from the group consisting of polyethylene terephthalate (PET), polybutylene terephthalate (PBT), polylactic acid (PLA), polyhydroxybutyrate (PHB), polyhydroxybutyrate-co-valerate (PHBV), and combinations thereof.

4. A thermoplastic composition consisting of:
(a) about 99.21% to about 99.35%, by weight of the thermoplastic composition, of a polyester,
(b) about 0.19% to about 0.20%, by weight of the thermoplastic composition, of a first anthraquinone dye comprising a combination of Disperse Violet 31 and Disperse Violet 26,
(c) about 0.064% to about 0.070%, by weight of the thermoplastic composition, of a second anthraquinone dye comprising Solvent Violet 13,
(d) about 0.36% to about 0.40%, by weight of the thermoplastic composition, of titanium dioxide, and
(e) about 0.04% to about 0.20%, by weight of the thermoplastic composition, of at least one additive selected from antioxidant, plasticizer, and dispersant, wherein the antioxidant is selected from phenolic antioxidant.

5. The thermoplastic composition of claim 4, wherein a plaque molded from the thermoplastic composition blocks UV-Vis light in the range of 190 nm to 750 nm with 1% or less UV-Vis light transmission at a plaque thickness of 0.5 mm.

6. The thermoplastic composition of claim 4, wherein the polyester is selected from the group consisting of polyethylene terephthalate (PET), polybutylene terephthalate (PBT), polylactic acid (PLA), polyhydroxybutyrate (PHB), polyhydroxybutyrate-co-valerate (PHBV), and combinations thereof.

7. A thermoplastic composition consisting of:
(a) 98.94% to 99.61%, by weight of the thermoplastic composition, of a polyester,
(b) 0.14% to 0.30%, by weight of the thermoplastic composition, of a first anthraquinone dye comprising a combination of Disperse Violet 31 and Disperse Violet 26,
(c) 0.05% to 0.08%, by weight of the thermoplastic composition, of a second anthraquinone dye comprising Solvent Violet 13,
(d) 0.20% to 0.48%, by weight of the thermoplastic composition, of titanium dioxide, and
(e) 0 to 0.20%, by weight of the thermoplastic composition, of at least one additive selected from antioxidant, plasticizer, and dispersant, wherein the antioxidant is selected from phenolic antioxidant;
wherein the polyester is selected from the group consisting of polyethylene terephthalate (PET), polybutylene terephthalate (PBT), polylactic acid (PLA), polyhydroxybutyrate (PHB), polyhydroxybutyrate-co-valerate (PHBV), and combinations thereof; and
wherein a plaque molded from the thermoplastic composition blocks UV-Vis light in the range of 190 nm to 750 nm with 1% or less UV-Vis light transmission at a plaque thickness of 0.5 mm.

* * * * *